United States Patent [19]

Egglestone

[11] Patent Number: 4,925,456
[45] Date of Patent: May 15, 1990

[54] PROCESS AND APPARATUS FOR THE PRODUCTION OF SYNTHESIS GAS

[75] Inventor: Frederick Egglestone, Crawley, England

[73] Assignee: The Bristish Petroleum COmpany p.l.c., London, England

[21] Appl. No.: 128,829

[22] PCT Filed: Apr. 15, 1987

[86] PCT No.: PCT/GB87/00252
§ 371 Date: Nov. 24, 1987
§ 102(e) Date: Nov. 24, 1987

[87] PCT Pub. No.: WO87/06221
PCT Pub. Date: Oct. 22, 1987

[30] Foreign Application Priority Data

Apr. 15, 1986 [GB] United Kingdom ............... 8609099

[51] Int. Cl.$^5$ .................. B01J 12/00; C01B 3/34; C01B 3/38
[52] U.S. Cl. .................. 48/127.9; 252/373; 422/190; 422/203
[58] Field of Search .............. 423/602, 655, 656; 252/373; 422/203, 190, 191, 312, 200; 48/196 A, 94, 95, 197 R, 214 A

[56] References Cited

U.S. PATENT DOCUMENTS

| 1,843,063 | 1/1932 | Burke | 252/373 |
| 1,959,151 | 5/1934 | Berkley | 423/652 |
| 3,262,758 | 7/1966 | James et al. | 422/203 |
| 3,450,514 | 6/1969 | Sinfelt et al. | 48/214 A |
| 4,079,017 | 3/1978 | Crawford et al. | 252/373 |
| 4,296,085 | 10/1981 | Banquy | 252/373 |
| 4,341,737 | 7/1982 | Albavo et al. | 422/191 |
| 4,479,925 | 10/1984 | Shires et al. | 252/373 |
| 4,650,651 | 3/1987 | Frieder | 422/191 |
| 4,666,680 | 5/1987 | Lewis | 252/373 |
| 4,678,600 | 7/1987 | Stahl et al. | 252/373 |

FOREIGN PATENT DOCUMENTS 2153382 8/1985 United Kingdom .
2179366 3/1987 United Kingdom .

OTHER PUBLICATIONS

Chem Abstracts, vol. 103, No. 24, #198441f, 12/1985.
Perry's Chemical Engineers Handbook, 1973, pp. 11-5 to 11-8, 11-20, 11-21.

Primary Examiner—Peter Kratz
Attorney, Agent, or Firm—Brooks, Haidt, Haffner & Delahunty

[57] ABSTRACT

A plurality of double pipe heat exchangers are used for primary reforming in a combined primary and secondary reforming process and apparatus.

16 Claims, 4 Drawing Sheets

PROCESS AND APPARATUS FOR THE PRODUCTION OF SYNTHESIS GAS

The present invention relates to a process and apparatus for the production of synthesis gas.

Synthesis gas is the name generally given to a gaseous mixture principally comprising carbon monoxide and hydrogen, but also possibly containing carbon dioxide and minor amounts of methane and nitrogen. It is used, or is potentially useful, as feedstock in a variety of large-scale chemical processes, for example the production of methanol, the production of gasoline boiling range hydrocarbons by the Fischer-Tropsch process and the production of ammonia.

Processes for the production of synthesis gas are well known and generally comprise steam reforming, autothermal reforming, non-catalytic partial oxidation of light hydrocarbons or non-catalytic partial oxidation of any hydrocarbons. Of these methods, steam reforming is generally used to produce synthesis gas for conversion into ammonia or methanol.

Modifications of the simple steam reforming processes have been proposed. In particular, there have been suggestions for improving the energy efficiency of such processes in which the heat available from a secondary reforming step is utilised for other purposes within the synthesis gas production process. For example, processes are described in GB-A-1550754, US-A-4479925 and GB-A-2153382 in which heat from a seconary reformer is used to provide heat to a primary reformer.

GB-A-1,550,754 describes a process for the steam reforming of hydrocarbons by the sequence of primary and secondary reforming, which comprises the steps of (a) heating a first mixture of hydrocarbons in the presence of a steam reforming catalyst to form a first partially reformed effluent, (b) heating a second mixture of hydrocarbon feed and steam to conditions at which primary reforming occurs by indirect heat exchange with the process gas as hereinafter defined and reforming said hydrocarbons in the presence of a steam reforming catalyst to form a second partially reformed effluent, (c) introducing said first and second partially reformed effluents to a secondary reformer to carry out said secondary reforming in the presence of oxygen and forming a secondary reforming effluent, and passing said secondary reforming effluent as the process gas in indirect heat exchange with said second mixture of hydrocarbon feed as set forth in (b) above.

The primary reformer which is heated by the effluent from the secondary reformer is a shell and tube heat exchanger-reactor.

US-A-4479925 discloses a process for producing ammonia synthesis gas in a reactor-exchanger primary reformer followed by an autothermal secondary reformer in which the primary reformer is heated by synthesis gas from the secondary reformer. The primary and secondary reformers are separate units, the primary unit being a shell and tube heat exchanger-reactor.

GB-A-2153392 discloses an autothermal process for producing a synthesis gas in which a mixture of steam and hydrocarbon feed gas is reacted by passing the mixture through a catalyst in counter-current flow to the combustion reaction effluent of the process, to cool the reaction effluent and to provide heat for the reaction of the steam-hydrocarbon feed gas mixture and introducing oxygen or oxygen-enriched air to form said combustion reaction effluent. The patent application also discloses a reactor for carrying out the process which esentially comprises a shell and tube heat exchanger-reactor as the primary reformer.

The present invention provides a process and apparatus for the production of synthesis gas by the sequence of primary and secondary reforming in which the available heat of the effluent from the secondary reforming is efficiently used to provide heat for the primary reforming. The apparatus has the advantage that it is mechanically reltively simple. The apparatus is of a modular design which allows the heat requirement to be easily changed and which also provides operational and maintenance advantages.

Thus, according to the present invention a process for producing synthesis gas by the sequence of primary and secondary reforming comprising;

(a) feeding hydrocarbon-containing gas and steam to a primary reforming zone containing a primary stem reforming catalyst under reforming conditions wherein the hydrocarbon gas is partially reformed to produce a primary reformer effluent, (b) feeding the primary reformer effluent and oxygen-containing gas to a secondary reforming zone containing seconary reforming catalyst under reforming conditions wherein a secondary reformer effluent is produced, (c) passing the secondary reformer effluent to the primary reforming zone as indirect heating medium, and (d) removing the secondary reforming effluent from the primary reformng zone and recovering the raw synthesis gas, characterized in that the primary reforming zone comprises at least one double-pipe heat exchanger-reactor, the primary steam reforming catalyst being positioned either in the central core of the double-pipe heat exchanger-reactor or in the annulus thereof and in that the secondary reformer effluent is passed through whichever of the central core or annulus does not contain the primary steam reforming catalyst countercurrently to the hydrocarbon-containing gas and steam.

The present invention includes apparatus suitable for producing synthesis gas by the process as hereinbefore described which apparatus comprises a primary reforming zone and a secondary reforming zone, characterised in that the primary reforming zone comprises at least one double-pipe heat exchanger-reactor capable of containing a primary steam reforming catalyst in either the central core or annulus, the double-pipe heat exchanger-reactor having at least one inlet for introducing steam and hydrocarbon-containing gas into whichever of the central core or annulus contains the primary steam reforming catalyst, an outlet for conveying primary reformer effluent to the secondary reforming zone and an inlet for introducing secondary reformer effluent into whichever of the central core or annulus does not contain the primary steam reforming catalyst, countercurrently to the steam and hydrocarbon-containing gas, the secondary reforming zone which is capable of containing secondary reforming catalyst has an inlet for primary reformer effluent, an inlet for oxygen-containing gas and an outlet for conveying the secondary reformer effluent to the primary reforming zone.

If the primary steam reforming catalyst is positioned in the inner core of the double-pipe heat exchanger-reactor, the outer pipe tends to be subjected to a higher temperature and would have to have a relatively thick wall unless insulated. Preferably, therefore, in operation the primary steam reforming catalyst of the primary reforming zone is positioned in the annulus of the (or each) double-pipe heat exchanger-reactor(s).

Generally, the primary reforming zone will comprise a plurality of double-pipe heat exchanger-reactors. Each double-pipe heat exchanger-reactor may be associated with a separate secondary reforming zone. However, in a preferred embodiment, a plurality of double-pipe heat exchanger-reactors, typically 2 to 10, are associated with a single secondary reforming zone. Thus, for example, apparatus according to the present invention may comprise 7 secondary reforming zones each of which is associated with 6 double-pipe heat exchanger-reactors i.e. the total number of double-pipe heat exchanger-reactors is 42.

Suitably, the apparatus according to the present invention may be constructed as a single unit in order to reduce piping and ancillary units.

In a preferred embodiment of the present invention a plurality of double-pipe heat exchanger-reactors are arranged peripherally about the circumference of a single secondary reforming zone and are close-coupled thereto by, for example, interconnecting pipes. Typically, the secondary reforming zone may be of about 4 m diameter and may have about 12 double-pipe heat exchanger-reactors arranged around the periphery thereof. Advantages of the arrangement of the preferred embodiment are that it is more compact, i.e. it occupies a smaller area, and it facilitates the removal of one or more exchanger-reactors for maintenance purposes without substantially affecting operation of the remaining exchanger-reactors. Furthermore, it simplifies operation because it reduces the number of control operations, there being only one secondary reforming zone to control.

Whichever of the central core or annulus of each double-pipe heat exchanger-reactor is not being used for the primary reforming catalyst may be used to contain secondary reforming catalyst. Generally, the geometry of the double-pipe heat exchanger-reactor will not accomodate all of the secondary reforming catalyst, but by utilising the volume of the double-pipe heat exchanger-reactor, the volume of the second reforming reactor may be reduced.

The hydrocarbon-containing gas may suitably be any hydrocarbon capable of undergoing a steam reforming reaction, such as, for example, at least one hydrocarbon ranging from machine to naphthas having an end point of about 220° C., including natural gs, ethane, propane and LPG. A preferred hydrocarbon-containing gas is natural gas. If required, the hydrocarbon-containing gas may first of all be desulphurised using technology known in the art and pressurised e.g. to about 40 to 80 atmospheres.

The feed to the primary reforming zone may optionally also include carbon dioxide.

The hydrocarbon-containing gas, steam and optionally carbon dioxide may suitably be preheated for example to a temperature in the range 400° to about 650° C. before being introduced into the primary reforming zone. This preheating may suitably be accomplished at least in part by using waste heat from elsewhere in the process and/or by, for example a fired heater. At least the hydrocarbon-containing gas portion of the feed may then be passed through a catalyst guard bed for the purpose of removing impurities therein, for example sulphur, which may be undesireable downstream to, for example, the steam reforming catalyst.

The preheated feed is then passed to the primary reforming zone which comprises at least one double-pipe heat exchanger reactor containing a primary steam reforming catalyst in either the central core or, preferably, the annulus under steam reforming conditions.

Double-pipe heat exchangers are known and comprise two pipes one positioned inside the other, generally substantially concentrically. A packed stuffing box may be used to allow differential movement and removal of the inner pipe for cleaning or maintenance purposes.

The primary steam reforming catalyst used in the primary reforming zone may be any suitable catalyst including conventional steam reforming catalysts such as, for example, nickel, nickel oxide, chromia, molybdenum, or mixtures thereof, either supported or unsupported.

The primary reformer effluent which comprises unchanged hydrocarbon, carbon monoxide and hydrogen leaves the primary reforming zone at a temperature which is typically in the range from 650° to 950° C. and is fed to the secondary reforming zone. The secondary reforming reactor contains secondary reforming catalyst which may be a catalyst of the same type as used in the primary reforming zone.

The oxygen-containing gas which is fed to the second reforming zone is suitably air, oxygen-enriched air or oxygen and is preferably preheated to a temperature in the range 100° to 300° C. The oxygen-containing gas is preferably oxygen if the synthesis gas is to be converted to methanol and air or oxygen-enriched air if it is to be converted to ammonia.

Steam, hydrocarbon-containing gas and/or carbon dioxide may also be fed to the second reforming zone. The hydrocarbon-containing gas, if used, is preferably obtained by dividing the feed to the primary reforming zone suitably after preheating.

The secondary reforming zone suitably takes the form of a refractory lined reactor operable under essentially adiabatic conditions. Part of the hydrocarbon is combusted in order to provide the heat required for reformation. Suitably, the temperature in the second reforming zone is maintained in the range from 900° to 1400° C., typically about 1200° C. The second reformer effluent is then passed to the primary reforming zone as the indirect heat exchange medium. The available heat of the second reformer effluent is used to provide heat for the endothermic reforming reactions by passing the second refrmer effluent through one or more double-pipe heat exchanger-reactors counter-currently to the hydrocarbon-containing gas and steam feed mixture.

In an embodiment of the present invention, whichever of the central core or annulus of each double-pipe heat exchanger-reactor does not contain primary reforming catalyst may contain a carbon monoxide shift catalyst.

The carbon monoxide shift catalyst may suitably be either or both a conventional high temperature shift catalyst, for example Fe/Cr, or a steam reforming catalyst. An advantage of using this catalyst disposition is that, as the gas from the secondary reformer is cooled as it passes through the primary reforming zone, an extra exotherm is given out as the shift reaction:

$$CO + H_2O \rightleftharpoons CO_2 + H_2$$

proceeds to the right hand side of the equation to maintain chemical equilibrium. This extra heat can be used to increase the gas outlet temperature, all other things being equal, thereby increasing the temperature driving force at the cooler end of the exchanger.

This enables operation with a lower steam consumption than would be possible without shift equilibrium. Another advantage of maintaining shift equilibrium as the gas is cooled is that the possible formation of carbon by the reaction:

$$2CO \rightarrow CO_2 + C$$

which can lead to blockage of the heat exchanger, is eliminated. For similar reasons, a shift catalyst may be included in downstream equipment, for example waste heat boilers.

The secondary reformer effluent is removed from the primary reforming zone at a temperature which may be for example in the range from 450° to 700° C. and preferably cooled, thereby raising some or all the steam required in the process. After cooling, carbon dioxide may be recovered from the effluent. Methods for removing carbon dioxide from such compositions are well know in the art. Any suitable method may be used, but it is preferred to use a physical solution process in order to avoid a demand for large quantities of steam for regeneration.

Carbon dioxide recovered from the secondary reformer effluent may be fed to the primary and/or secondary reforming zones, if required.

The process and apparatus according to the present invention can have a number of advantages over known processes and apparatus. The apparatus is relatively simple and can be manufactured using standard pipe sections. Thus the capital cost of the apparatus is low. Also the apparatus can be designed in the form of modules which allows the heat requirement and/or capacity of the process to be relatively easily changed by adding or removing double-pipe heat exchanger-reactors and/or secondary reforming reactors. This modular approach enables the apparatus to be easily transported and installed. It also allows individual double-pipe heat exchanger-reactors and/or secondary reactors to be shut-down for maintenance or replacement without having to shut-down the whole process. The use of double-pipe heat exchanger reactors also provides more uniform heating than shell and tube heat exchangers in which tubes at the edge of the tube bundle may be subjected to a different rate of heat exchange than tubes at the centre of the tube bundle.

The process and apparatus according to the present invention will now be further described with reference to the accompanying drawings in which.

Figure 1:
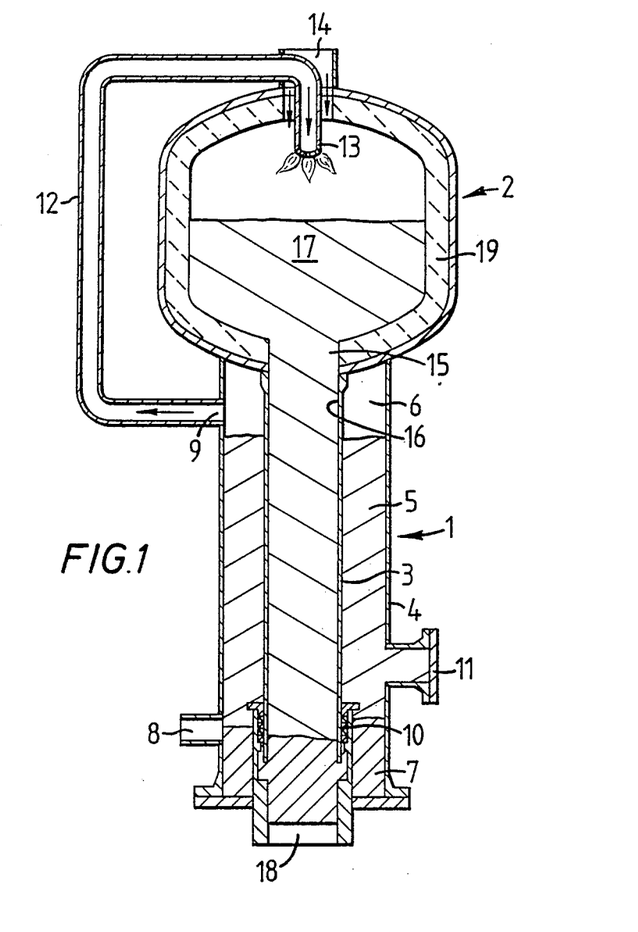
FIG. 1 is a schematic sectional view of one embodiment of the apparatus according to the present invention.

FIG. 1 illustrates an integral primary and secondary reformer comprising a primary reforming zone 1 and a secondary reforming zone 2. The primary reforming zone 1 comprises a double-pipe heat exchanger-reactor having an inner pipe 3 and an outer pipe 4, the two pipes are substantially concentric. A primary reforming catalyst 5 is packed into the annulus 6 formed between the inner pipe 3 and outer pipe 4 which catalyst is supported by packing 7. The feed for the primary reformng zone enters through inlet 8 and the primary reformer effluent leaves through outlet 9. Thus the feed passes along the length of the annulus 6 of the double-pipe heat exchanger-reactor. A packed gland 10 is provided to permit relative movement between the inner pipe 3 and outer pipe 4. The primary reforming zone is also provided with an access port 11. The secondary reforming zone 2 comprises a reactor, lined with a refractory material 19, attached to the primary reforming zone 1 at the opposite end to the feed inlet 8. Pipe 12 conveys the primary reformer effluent from the primary reforming zone 1 to the inlet 13 of the secondary reforming zone 2. Oxygen-containing gas and optionally steam, hydrocarbon-containing gas and/or carbon dioxide can be introduced via inlet 14. It will be appreciated that inlet 14 may be replaced by a number of separate inlets. The secondary reformer effluent leaves the secondary reforming zone 2 via outlet 15 which is connected to the inner core 16 of the primary reforming zone 1. The secondary reforming catalyst is shown as being contained in the secondary reforming zone 2 and also in the inner core 16 of the primary reforming zone.

The secondary reformer effluent passes along the length of the central core 16 of the primary reforming zone 1, countercurrently to the primary reformer feed, and leaves through outlet 18.

The pipe 3,4 of the double-pipe heat exchanger-reactor may be of any suitable size. For example in an embodiment of the present invention, the inner pipe 3 may have a nominal bore of 6 inches (152 mm) and the outer pipe 4 may have a nominal bore of 10 inches (254 mm). In another embodiment the inner pipe 3 may have a nominal bore of 8 inches (203 mm) and the outer pipe may have a nominal bore of 12 inches (305 mm).

The inner wall of the outer pipe 4 may be insulated e.g. with a refractory material in order to reduce heat loss. Insulating the inner wall of the outer pipe 4 may also allow a lower specification, lower cost material to be used for the pipe wall.

Since the temperatures to which the material of the pipes 3,4 will be exposed will be different at different positions along the length of the double-pipe heat exchanger-reactor, different materials can be used at different positions. For example, a metal suitable for use in a high temperature environment may be required adjacent the inlet for the secondary reformer effluent 15 whereas a lower specification, lower cost metal may be adequate adjacent the outlet 18 for the secondary reforming effluent.

Figure 2:
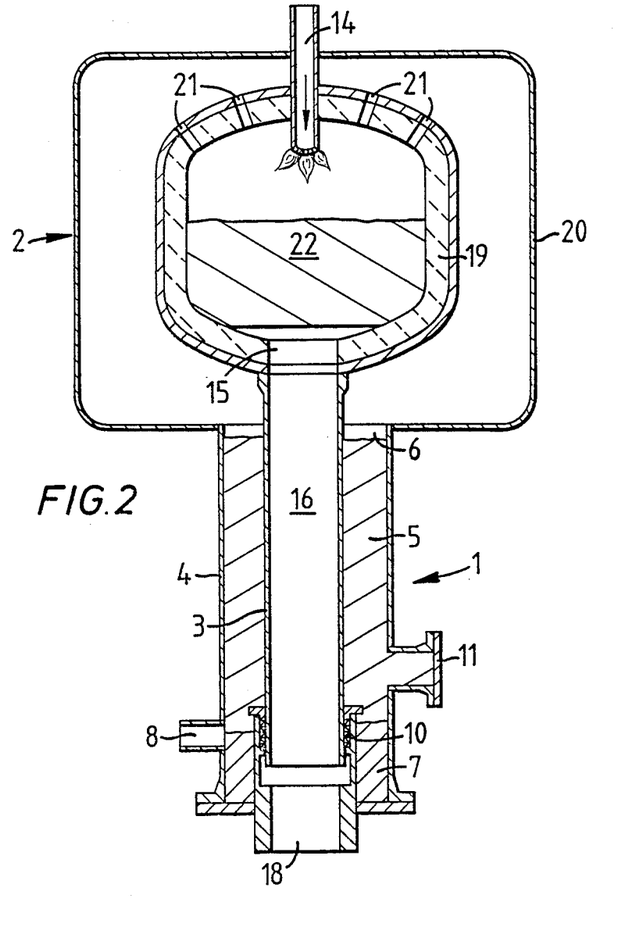
FIG. 2 is a schematic sectional view of a second embodiment of the apparatus according to the present invention and FIG. 3 is a schematic plan view of a preferred arrangement of a plurality of double-pipe heat-exchanger reactors and a secondary reforming zone.

FIG. 2 illustrates a second embodiment of the apparatus according to the present invention in which the same reference numerals as used in FIG. 1 are used to identify the same elements. The second embodiment differs from the first embodiment in that in place of the pipe 12 for conveying the primary reformer effluent from the primary reforming zone 1 to the secondary reforming zone 2 a shell 20 is used which encloses the second reforming zone, this shell 20 is directly connected to the annulus 6 of the primary reforming zone and together with the secondary reforming zone forms an annulus for conveying the primary reforming effluent about the secondary reforming zone. The primary reforming effluent enters the secondary reforming zone via openings 21. In this embodiment, the secondary reforming catalyst 22 is shown as a bed which is wholly contained within the secondary reforming zone 2. The central core 16 of the double-pipe heat exchanger reactor may be packed with a carbon monoxide shift catalyst if desired.

Figure 3:
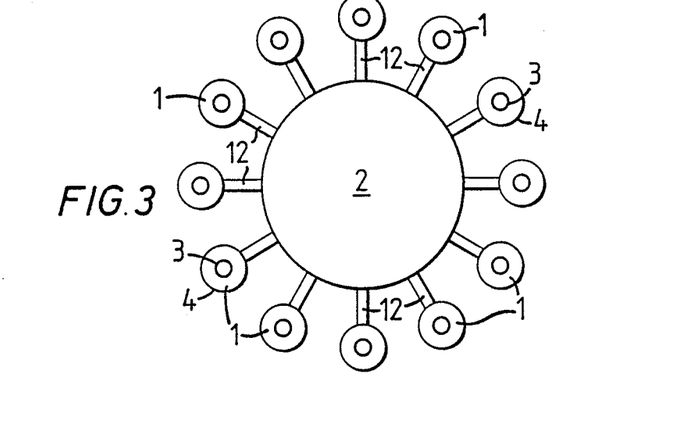

FIG. 3 illustrates a preferred embodiment of the apparatus according to the invention in which the same reference numerals as used in FIG. 1 are used to identify the same elements. In this embodiment a plurality of double-pipe heat exchanger-reactors 1 are peripherally arranged around the circumference of the secondary reforming zone 2, being close-coupled thereto by interconnecting pipes 12.

Figure 4:
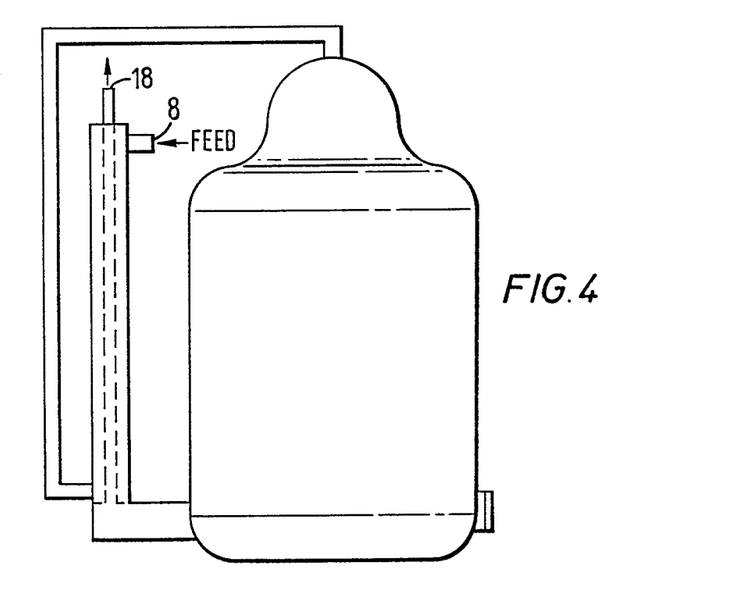
FIG. 4 is a schematic elevation view of the arrangement of FIG. 3.

FIG. 4 illustrates an elevation view of the arrangement of FIG. 3 in which the same reference numerals as used in FIG. 1 are used to identify the same elements. In this embodiment, instead of a single large diameter outlet 18 for the secondary reforming effluent there may be used a number of smaller diameter outlets. It will be readily appreciated that different arrangements of inlets 13 and 14 and pipes 12 are possible.

Figure 5:
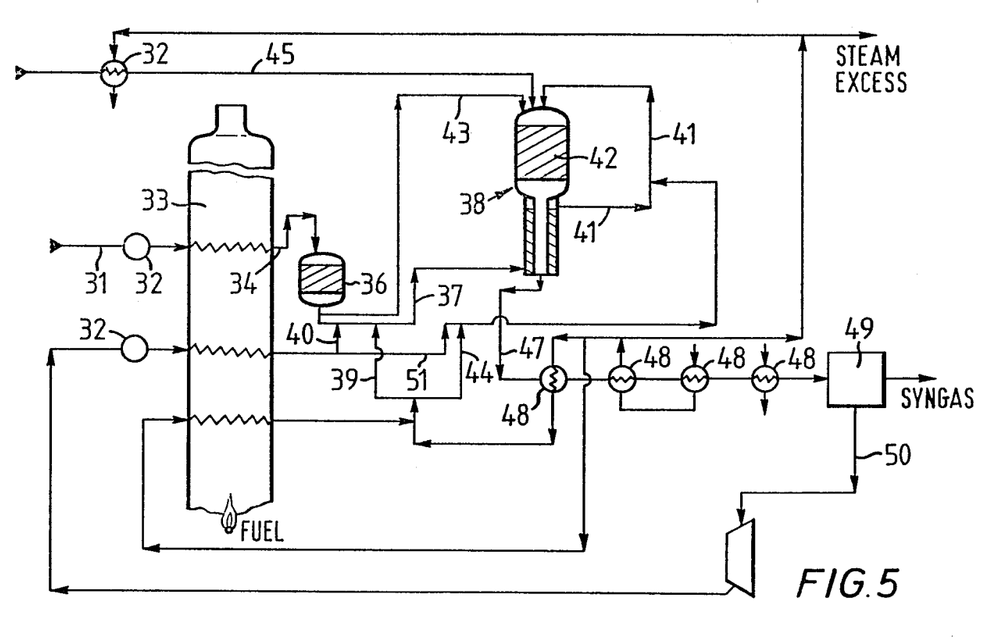
FIG. 5 is a flow diagram of a process according to the present invention.

A process for producing synthesis gas according to the present invention is illustrated in FIG. 5. In FIG. 5, 32 represents a preheater, 33 represents a fired heated, 36 is a guard bed, 38 is an integrated primary and secondary reformer according to the present invention such as illustrated in FIG. 1 or FIG. 2, 48 is a boiler for generating steam and 49 is a carbon dioxide recovery plant.

Desulphurised natural gas is fed through line 31 to the preheater 32 and thereafter through the fired heater 33. After exiting through line 34, it is passed through the guard bed 36 wherein poisons detrimental to the operation of the reforming catalysts are removed. A proportion of the natural gas is then passed through line 37 to the primary reforming zone of the inegrated primary and secondary reformer 38. Carbon dioxide may also be fed to the primary reforming zone through line 40. Superheated steam is introduced via line 39.

The gas at exit from the primary reformer which may contain a considerable proportion of unconverted methane is passed through line 41 to the secondary reforming zone of the integrated reformer 38. Also passed to the secondary reformer is a proportion of the preheated fresh natural gas through line 43, steam through line 44 and preheated oxygen through line 45. The facility also exists for adding carbon dioxide through line 51.

The gaseous stream exiting from the secondary reforming zone is passed as the indirect heating medium to the primary reforming zone of the integrated primary and secondary reformer 38 which may contain a catalyst to promote the shift reaction. In cooling and reacting it heats the primary reaction gases.

The secondary reformer effluent is then passed out of the primary reforming zone through line 47 and is cooled in the boiler 48. The steam raised thereby can be used in the process. Carbon dioxide can be recovered from the cooled gas stream in the carbon dioxide removal plant 49 using conventional technology. Recovered carbon dioxide can be recycled through line 50 to the reformer 38, optionally via a gas compressor.

The heat available from the secondary effluent may not be sufficient for all of the primary reforming. Additional primary reformer effluent may therefore be provided by a conventional radiant steam reforming furnace (not shown). Additional heat may be provided to the primary reforming zone of the apparatus according to the present invention. For example, the double-pipe heat exchanger-reactors may be positioned in a radiant furnace (not shown).

I claim:

1. Apparatus for the two-stage production of synthesis gas from hydrocarbons, said apparatus comprising:
   a plurality of double pipe heat exchangers, each of said heat exchangers comprising an inner pipe having a central bore space with a first end and an opposite, second end and an outer pipe co-axial with said inner pipe and of an internal diameter larger than the external diameter of said inner pipe to define an annular space between said inner pipe and said outer pipe with a first end adjacent said first end of said bore space and an opposite, second end, one said space containing a primary reforming catalyst,
   a shell defining a secondary reforming zone containing a secondary reforming catalyst bed, said shell having an inlet for receiving primary reforming effluent gas from said one said space and an outlet spaced from said inlet and at the opposite side of said catalyst bed from said inlet, said outlet permitting the passage of secondary reforming effluent;
   means interconnecting said first end of said one said space of each of said plurality of heat exchangers with said inlet of said shell for the passage of said primary reforming effluent into said secondary reforming zone,
   means interconnecting said first end of the other said space of each of said heat exchangers with said outlet of said shell for the passage of secondary reforming effluent into said other said space of each of said heat exchangers,
   means for supplying steam and hydrocarbon containing gas to said second end of said one said space containing said primary reforming catalyst of each of said heat exchangers; and
   means at said second end of said other said space of each of said heat exchangers for the passage of secondary reformer effluent out of said other said space of each of said heat exchangers,
   whereby the effluent gases exiting from said secondary reforming zone flow countercurrently to the gases in the spaces containing the primary reforming catalyst and heat is transferred from the seconary reformer effluent to the materials within the spaces containing the primary reforming catalyst.

2. Apparatus as claimed in claim 1 wherein said one said space is said annular space.

3. Apparatus as claimed in claim 2 wherein said heat exchangers are disposed exteriorly of said shell and in spaced relation around the periphery of said shell.

4. Apparatus as claimed in claim 1 wherein said other space contains a carbon monoxide shift catalyst.

5. Apparatus as claimed in claim 1 wherein said means for supplying steam and hydrocarbon containing gas comprises a source of super-heated steam and a source of said hydrocarbon connected to said second end of said one said space of each of said heat exchangers and further comprising a source of oxygen and optionally, a source of at least one gas from the group consisting of steam, hydrocarbon gas and carbon dioxide connected to said inlet of said shell.

6. Apparatus as claimed in claim 1 wherein said secondary reforming zone is cylindrical and has a diameter which is large relative to that of each of said outer pipe.

7. Apparatus as claimed in claim 1 further comprising a guard bed connected intermediate said means for supplying hydrocarbon containing gas and said second end of said one said space.

8. Apparatus as claimed in claim 1 wherein each double-pipe heat exchanger-reactor is provided with a packed stuffing box intermediate said inner pipe and said outer pipe.

9. Apparatus as claimed in claim 1 further comprising a means for preheating the hydrocarbon-containing gas and the steam.

10. Apparatus as claimed in claim 1 wherein said shell is refractory lined and adapted to operate under essentially adiabatic conditions.

11. Apparatus as claimed in claim 10 wherein said shell defines a seconary reforming zone four meters in diameter and said double pipe heat exchangers are twelve in number and are disposed exteriorly of said shell and in spaced relation around the periphery of said shell.

12. A process for producing synthesis gas by a sequence of primary and secondary reforming comprising:

feeding hydrocarbon-containing gas and steam to a primary reforming zone, said zone comprising a plurality of double pipe heat exchangers, each of said heat exchangers comprising an inner pipe having a central bore space with a first end and an opposite second end and an outer pipe co-axial with said inner pipe and of an internal diameter larger than the external diameter of said inner pipe to define an annular space between said inner pipe and said outer pipe with a first end adjacent said first end of said bore space and an opposite second end, one of said space containing a primary reforming catalyst, said hydrocarbon containing gas and said steam being fed to the second end of said one said space containing said primary reforming catalyst of each said plurality of heat exchangers;

feeding the primary reformer effluent exiting from said first end of said one said space of each of said heat exchangers and an oxygen containing gas to a secondary reforming zone in the form of a single chamber having an inlet to which said effluent gas and said oxygen containing gas are fed, an outlet spaced from said inlet for the passage of secondary reformer effluent and a secondary reforming catalyst intermediate said inlet and said outlet, feeding the secondary reformer effluent to said first end of the other said space of each of said heat exchangers; and removing secondary reformer effluent from said second end of said other said space whereby the effluent gases exiting from said secondary reformer effluent flow countercurrently to the gases in the spaces containing said primary reforming catalyst and heat is transferred from the secondary reformer effluent to the materials within the spaces containing the primary reforming catalyst.

13. Process as claimed in claim 12 wherein said one said space is said annular space and wherein said hydrocarbon containing gas and said steam are fed to said second end of said annular space.

14. Process as claimed in claim 13 wherein said heat exchangers are disposed exteriorly of said chamber and in spaced relation around the periphery of said chamber.

15. Process as claimed in claim 12 wherein said other space contains a carbon monoxide shift catalyst.

16. Process as claimed in claim 12 further comprising also feeding at least one of hydrocarbon gas and carbon dioxide to said inlet of said chamber.

* * * * *

UNITED STATES PATENT AND TRADEMARK OFFICE
CERTIFICATE OF CORRECTION

PATENT NO. : 4,925,456

DATED : May 15, 1990

INVENTOR(S) : FREDERICK EGGLESTONE

It is certified that error appears in the above-identified patent and that said Letters Patent is hereby corrected as shown below:

Col. 2, l. 13, correct the spelling of "relatively"

Col. 3, l. 51, correct the spelling of "gas"

Col. 4, l. 51, correct the spelling of "reformer"

Col. 5, l. 24, correct the spelling of "known"

Col. 7, l. 40, correct the spelling of "integrated"

Col. 9, claim 6, l. 3, should read "to that of each said outer"

Col. 9, claim 12, l. 38, after "one", strike "of"

Signed and Sealed this

Fifth Day of November, 1991

Attest:

HARRY F. MANBECK, JR.

*Attesting Officer*  *Commissioner of Patents and Trademarks*